US012695342B2

(12) United States Patent
Mori

(10) Patent No.: US 12,695,342 B2
(45) Date of Patent: Jul. 28, 2026

(54) INTERIOR MAGNET ROTOR AND INTERIOR MAGNET ROTARY ELECTRIC MACHINE

(71) Applicant: KABUSHIKI KAISHA TOSHIBA, Tokyo (JP)

(72) Inventor: Daisuke Mori, Yokkaichi Mie (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 175 days.

(21) Appl. No.: 18/473,481

(22) Filed: Sep. 25, 2023

(65) Prior Publication Data

US 2024/0072583 A1    Feb. 29, 2024

Related U.S. Application Data

(63) Continuation of application No. PCT/JP2022/038530, filed on Oct. 17, 2022.

(30) Foreign Application Priority Data

Aug. 25, 2022    (JP) ................................. 2022-134141

(51) Int. Cl.
*H02K 1/276* (2022.01)

(52) U.S. Cl.
CPC .................................... *H02K 1/276* (2013.01)

(58) Field of Classification Search
CPC .. H02K 1/276; H02K 1/2766; H02K 2213/03; Y02T 10/64

(Continued)

(56) References Cited

U.S. PATENT DOCUMENTS 8,525,381 B2 * 9/2013 Yabe .................... H02K 1/2766
310/156.53
8,890,385 B2 * 11/2014 Sano .................... H02K 1/2766
310/156.53
(Continued)

FOREIGN PATENT DOCUMENTS

JP        2012216626 A  * 11/2012
JP        2014187748 A  * 10/2014
(Continued)

OTHER PUBLICATIONS

International Search Report and Written Opinion issued on Dec. 6, 2022, in corresponding International Application No. PCT/JP2022/038530; 9 pages.

(Continued)

*Primary Examiner* — Alex W Mok
(74) *Attorney, Agent, or Firm* — Maier & Maier, PLLC

(57) ABSTRACT

According to an embodiment, an interior magnet rotor includes a rotor shaft extending in a rotation axis direction, a rotor core, and a plurality of permanent magnets. The rotor core has at least one magnet housing hole formed in each magnetic pole and sandwiched by a first wall and a second wall, and is attached to the rotor shaft. The plurality of permanent magnets are housed in the magnet housing hole and are arranged in a row in one direction in a cross section of the magnet housing hole. The permanent magnets each have a substantially rectangular parallelepiped outer shape and have slopes formed over a longitudinal direction on two corners opposite to each other.

3 Claims, 8 Drawing Sheets

(58) Field of Classification Search
USPC .................................................. 310/156.56
See application file for complete search history.

(56)                     References Cited

U.S. PATENT DOCUMENTS

| | | | | |
|---|---|---|---|---|
| 9,312,731 | B2 * | 4/2016 | Takahashi ............ | H02K 1/2706 |
| 9,391,479 | B2 * | 7/2016 | Hong ....................... | H02K 1/28 |
| 9,754,719 | B2 * | 9/2017 | Ohshima ................. | H02K 15/03 |
| 9,793,770 | B2 * | 10/2017 | Takahashi ................ | H02K 1/32 |
| 2011/0193439 | A1 * | 8/2011 | Yabe ...................... | H02K 1/276 |
| | | | | 310/156.38 |
| 2014/0217849 | A1 * | 8/2014 | Soma ................... | H02K 1/2766 |
| | | | | 310/156.53 |
| 2020/0244121 | A1 * | 7/2020 | Takahashi .............. | H02K 21/14 |
| 2020/0336031 | A1 * | 10/2020 | Takahashi .............. | H02K 1/165 |
| 2020/0403468 | A1 * | 12/2020 | Takahashi .............. | H02K 9/197 |
| 2021/0273511 | A1 * | 9/2021 | Takahashi ................ | H02K 1/02 |

FOREIGN PATENT DOCUMENTS

| | | | | | |
|---|---|---|---|---|---|
| JP | 5776275 | B2 | | 9/2015 | |
| JP | 2018164378 | A | * | 10/2018 | ........... H02K 1/2768 |
| JP | 2019030207 | A | * | 2/2019 | |
| WO | 2014030547 | A1 | | 2/2014 | |

OTHER PUBLICATIONS

Partial Supplementary Search Report issued on Dec. 5, 2025, in corresponding European Application No. 22931235.0, 15 pages.

* cited by examiner

INTERIOR MAGNET ROTOR AND INTERIOR MAGNET ROTARY ELECTRIC MACHINE

CROSS-REFERENCE TO RELATED APPLICATIONS

This application is a continuation of prior International Application No. PCT/JP2022/038530, filed on Oct. 17, 2022; the entire contents of all of which are incorporated herein by reference.

FIELD

Embodiments of the present invention relate to an interior magnet rotor and an interior magnet rotary electric machine including the same.

BACKGROUND

In a synchronous machine such as an interior magnet synchronous motor whose rotor has permanent magnets, each of the permanent magnets is formed in a rectangular parallelepiped shape. This permanent magnet is a brittle member and is likely to be chipped by an impact, and if a fragment comes off because of the chipping, the volume of the magnet reduces, leading to a decrease in the amount of magnetic flux and deterioration in properties. Further, if a fragment comes off because of chipping, the fallen fragment is caught in or clogs a gap in the synchronous machine, which causes a mechanically adverse effect such as the restriction of rotation or an electrically adverse effect such as a short circuit. Further, if chipping occurs and a fragment comes off after surface treatment is applied for rust prevention, the material is exposed, which may cause corrosion (generation of rust) from the chipped portion.

Because of these reasons, in the case where the permanent magnet is formed in the shape having vertex portions (ridges), such as a substantially rectangular parallelepiped shape, after it is worked into this shape, chamfering is performed at its four corners to remove the vertex portions and form slopes, thereby preventing chipping caused by contact between the vertex portions of magnets during the manufacture.

Further, in recent years, to improve the efficiency of a rotary electric machine, a plurality of permanent magnets instead of a single permanent magnet are sometimes housed in a magnet hole of a rotor core, that is, the permanent magnet is practically divided into a plurality of pieces, whereby an eddy current generated in the permanent magnet is reduced. As a result, in the state of a product, the plurality of permanent magnets are adjacent to and in contact with each other.

The aforesaid chamfering is a work taking a lot of time and effort in the case where, for example, it is performed by barrel polishing or grinder polishing. Further, forming the slopes in advance using a die leads to an increase in the manufacturing cost.

Further, to form the slopes by removing the vertex portions as described above is, in other words, to previously reduce magnetic force by changing the rectangular parallelepiped shape of the magnet to a chipped state, and is a work without any electromagnetic merit. Further, it is necessary to note that dividing the magnet inserted in the rotor into the plurality of pieces increases the frequency with which the corners of the magnets come into contact with each other in the manufacturing process.

DETAILED DESCRIPTION

An object of the present invention is to provide an interior magnet rotor that achieves a reduction in a demagnetizing factor of its permanent magnet without causing an increase in an eddy current and without causing an increase in the risk of chipping of vertex portions in a plurality of permanent magnets housed in a row in a magnet housing hole.

Means for Solving the Problems

To attain the above object, an interior magnet rotor according to an embodiment of the present invention includes: a rotor shaft extending in a rotation axis direction; a rotor core that has at least one magnet housing hole formed in each magnetic pole and sandwiched by a first wall and a second wall, and that is attached to the rotor shaft; and a plurality of permanent magnets housed in the magnet housing hole and arranged in a row in one direction in a cross section of the magnet housing hole, wherein the plurality of permanent magnets each have a substantially rectangular parallelepiped outer shape and have slopes formed over a longitudinal direction at two corners opposite to each other.

An interior magnet rotor and an interior magnet rotary electric machine according to an embodiment of the present invention will be hereinafter described with reference to the drawings. Here, parts that are identical or similar to each other will be denoted by common reference signs and a redundant description thereof will be omitted.

Figure 1:
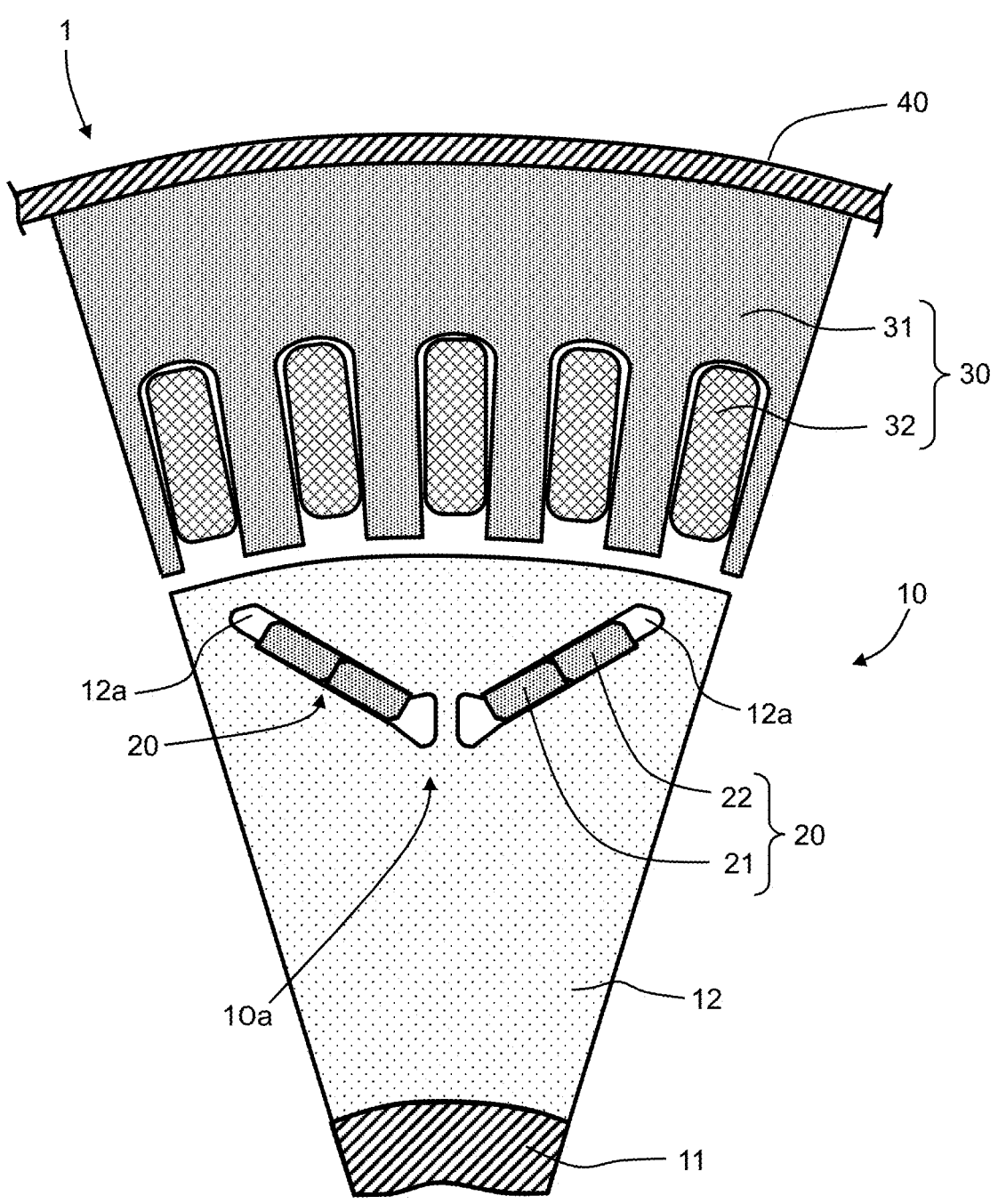
FIG. 1 is a partial cross sectional view illustrating the structure of an interior magnet rotary electric machine according to an embodiment.

FIG. 1 is a partial cross sectional view illustrating the structure of the interior magnet rotary electric machine 1 according to the embodiment.

The interior magnet rotary electric machine 1 has the interior magnet rotor 10, a stator 30, and a frame 40. The stator 30 has a stator core 31 arranged on a radially outer side of a rotor core 12 with gap therebetween, and stator windings 32 wound around the stator core 31. The frame 40 houses the stator 30.

The interior magnet rotor 10 has a rotor shaft 11, the rotor core 12 attached on the radially outer side of the rotor shaft 11, and a plurality of permanent magnets 20 housed in the rotor core 12.

The permanent magnets 20 each have a first permanent magnet 21 and a second permanent magnet 22 arranged in series.

FIG. 1 illustrates one magnetic pole 10a portion. Note that FIG. 1 illustrates, as an example, the case where the two permanent magnets 20 in the interior magnet rotor 10 are formed and arranged to make a pair, but this is not restrictive. For example, one of the permanent magnets 20 may form one magnetic pole.

The feature of this embodiment relates to the plurality of permanent magnets of the permanent magnet 20 in the case where the permanent magnets 20 each have the plurality of permanent magnets arranged in series. In the following, the case where number of the plurality of permanent magnets that the permanent magnet 20 is two, first permanent magnet 21 and second permanent magnet 22, as illustrated in FIG. 1 will be described as an example, but they may be three permanent magnets or more.

Figure 2:
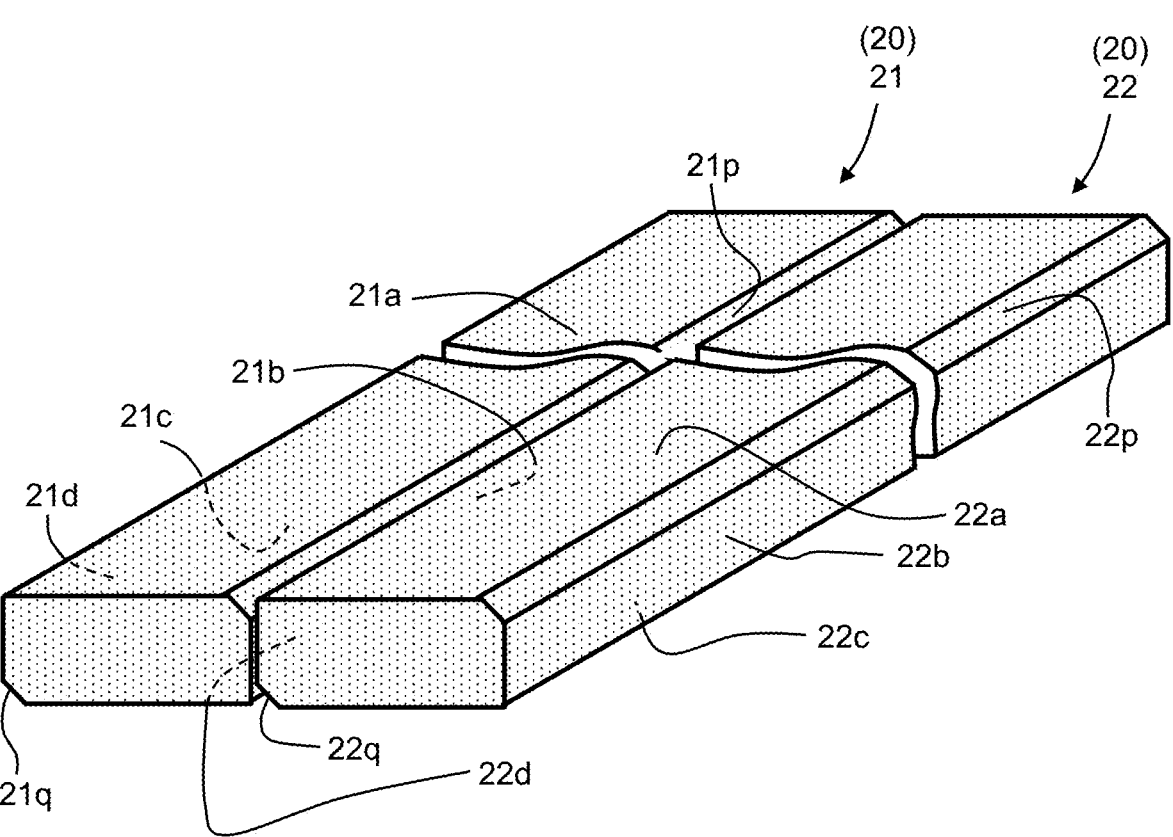
FIG. 2 is a perspective view illustrating a permanent magnet of an interior magnet rotor according to the embodiment.

FIG. 2 is a perspective view illustrating the permanent magnet 20 of the interior magnet rotor 10 according to the embodiment. FIG. 2 illustrates a state where the first permanent magnet 21 and the second permanent magnet 22 are arranged in a row.

The first permanent magnet 21 has a substantially rectangular parallelepiped shape. The first permanent magnet 21 has four side faces, namely, a first side face 21a, a second side face 21b, a third side face 21c, and a fourth side face 21d each located along the longitudinal direction, that is, the axial direction of the rotor shaft 11. On a corner where the first side face 21a and the second side face 21b connect with each other, a first corner slope 21p is formed. Further, on a corner where the third side face 21c and the fourth side face 21d connect with each other, a second corner slope 21q is formed. The first corner slope 21p makes a 45-degree angle with the first side face 21a and the second side face 21b. Similarly, the second corner slope 21q makes a 45-degree angle with the third side face 21c and the fourth side face 21d.

Similarly, the second permanent magnet 22 also has a substantially rectangular parallelepiped shape and has four side faces, namely, a first side face 22a, a second side face 22b, a third side face 22c, and a fourth side face 22d along the longitudinal direction, that is, the axial direction of the rotor shaft 11. On a corner where the first side face 22a and the second side face 22b connect with each other, a first corner slope 22p is formed. Further, on a corner where the third side face 22c and the fourth side face 22d connect with each other, a second corner slope 22q is formed. The first corner slope 22p makes a 45-degree angle with the first side face 22a and the second side face 22b. Similarly, the second corner slope 22q makes a 45-degree angle with the third side face 22c and the fourth side face 22d.

It should be noted that this angle is not limited to 45 degrees and may be 60 degrees with respect to one of the side faces, for instance. The angles of the first corner slope 21p and the second corner slope 21q may be different. Further, the areas of the first corner slope 21p and the second corner slope 21q may be different. In the following, the case where their angles are both 45 degrees and their areas are equal will be described as an example.

The first permanent magnet 21 and the second permanent magnet 22 are arranged with the first side face 21a of the first permanent magnet 21 and the first side face 22a of the second permanent magnet 22 facing the same direction, and with the second side face 21b of the first permanent magnet 21 and the third side face 22c of the second permanent magnet 22 facing and adjacent to each other. In other words, the first permanent magnet 21 and the second permanent magnet 22 are arranged in the same orientation.

Therefore, the first corner slope 21p and the second corner slope 21q of the first permanent magnet 21 and the first corner slope 22p and the second corner slope 22q of the second permanent magnet 22 are each adjacent to any of the side faces. That is, corners not having the first corner slope 21p nor the second corner slope 21q of the first permanent magnet 21 and corners not having the first corner slope 22p nor the second corner slope 22q of the second permanent magnet 22 are not adjacent to each other.

It is possible to form the corner slopes by chamfering the corners of the rectangular parallelepiped permanent magnet 20 by barrel polishing or grinder polishing, for instance. Alternatively, it is possible to form them by shaping the permanent magnet into the form having the corner slopes before sintering.

Figure 3:
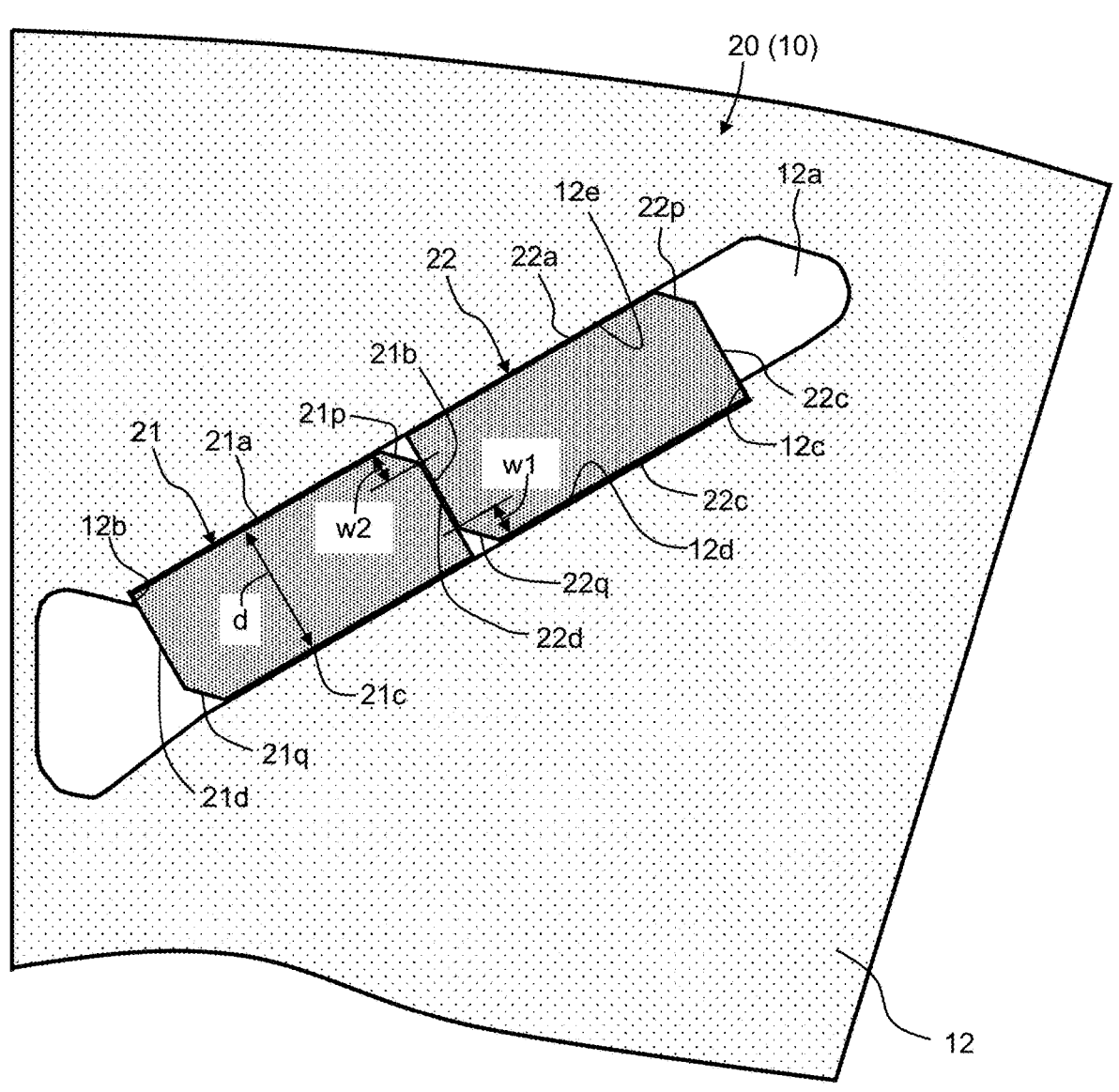
FIG. 3 is a partial cross sectional view illustrating the permanent magnet and a rotor core of the interior magnet rotor according to the embodiment.

FIG. 3 is a partial cross sectional view illustrating the permanent magnet 20 and the rotor core 12 of the interior magnet rotor 10 according to the embodiment. FIG. 3 illustrates only one of the two permanent magnets 20 forming the single magnetic pole 10a illustrated in FIG. 1.

The magnet housing hole 12a of the rotor core 12 has an outer positioning projection 12c formed on the radially outer side of a radially inner side face 12d of the magnet housing hole 12a, and the outer positioning projection 12c is a stepped portion toward the radially inner side. Further, an inner positioning projection 12b is formed on the radially inner side of a radially outer side face 12e of the magnet housing hole 12a and is a stepped portion toward the radially outer side.

In the magnet housing hole 12a, the permanent magnet 20 is housed and fixed in a region sandwiched by the inner positioning projection 12b and the outer positioning projection 12c. Specifically, as the permanent magnet 20, the first permanent magnet 21 is arranged on the radially inner side, and the second permanent magnet 22 is arranged on the radially outer side adjacently to the first permanent magnet 21.

The first permanent magnet 21 is arranged with its first side face 21a facing the radially outer side face 12e of the magnet housing hole 12a, its second side face 21b facing the second permanent magnet 22, its third side face 21c facing the radially inner side face 12d of the magnet housing hole 12a, and its fourth side face 21d partly facing the inner positioning projection 12b.

Further, the second permanent magnet 22 is arranged with its first side face 22a facing the radially outer side face 12e of the magnet housing hole 12a, its second side face 22b partly facing the outer positioning projection 12c, its third side face 22c facing the radially inner side face 12d of the magnet housing hole 12a, and its fourth side face 22d facing the first permanent magnet 21.

Here, the thickness of the first permanent magnet 21 and the second permanent magnet 22 is referred to as "d". Further, the width of the first corner slope 21p of the first permanent magnet 21 in a view of the first permanent magnet 21 seen from the second permanent magnet 22 side is referred to as "w1". Further, the width of the second corner slope 22q of the second permanent magnet 22 in a view of the second permanent magnet 22 seen from the first permanent magnet 21 side is referred to as "w2".

Because of such an arrangement of the first permanent magnet 21 and the second permanent magnet 22, the width of a contact surface between the first permanent magnet 21 and the second permanent magnet 22 is [d−(w1+w2)].

Figure 4:
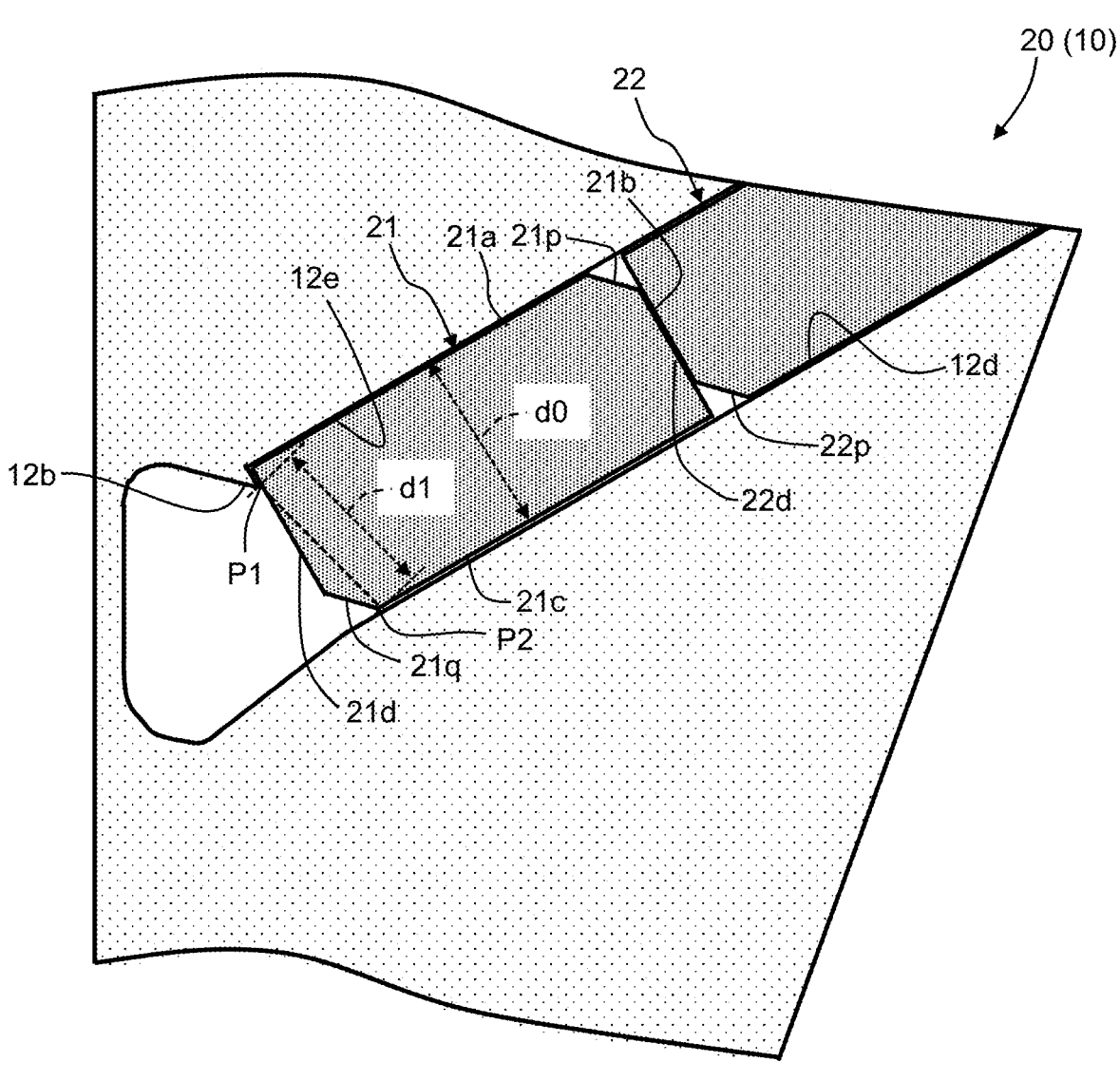
FIG. 4 is a partial cross sectional view illustrating a region around a first permanent magnet of the interior magnet rotor according to the embodiment.

FIG. 4 is a partial cross sectional view illustrating a region around the first permanent magnet 21 of the interior magnet rotor 10 according to the embodiment.

In the magnet housing hole 12*a* formed in the interior magnet rotor 10, the magnet housing hole 12*a* itself and the permanent magnet 20 housed in the magnet housing hole 12*a* have a high magnetic reluctance against an external magnetic field and function as a flux barrier. The width of the flux barrier is mostly equal to the distance d0 between the radially inner side face 12*d* and the radially outer side face 12*e* of the magnet housing hole 12*a*.

Around the first permanent magnet 21, the smallest width of the flux barrier is the distance d1 between point P1 and point P2 in the cross section shown in FIG. 4. Here, point P1 is the vertex portion of the inner positioning projection 12*b*. Further, point P2 is the radially innermost portion of the third side face 21*c* of the first permanent magnet 21. For a magnetic flux to pass between point P1 and point P2 with the shortest distance, it needs to pass the inside of the first permanent magnet 21.

Figure 5:
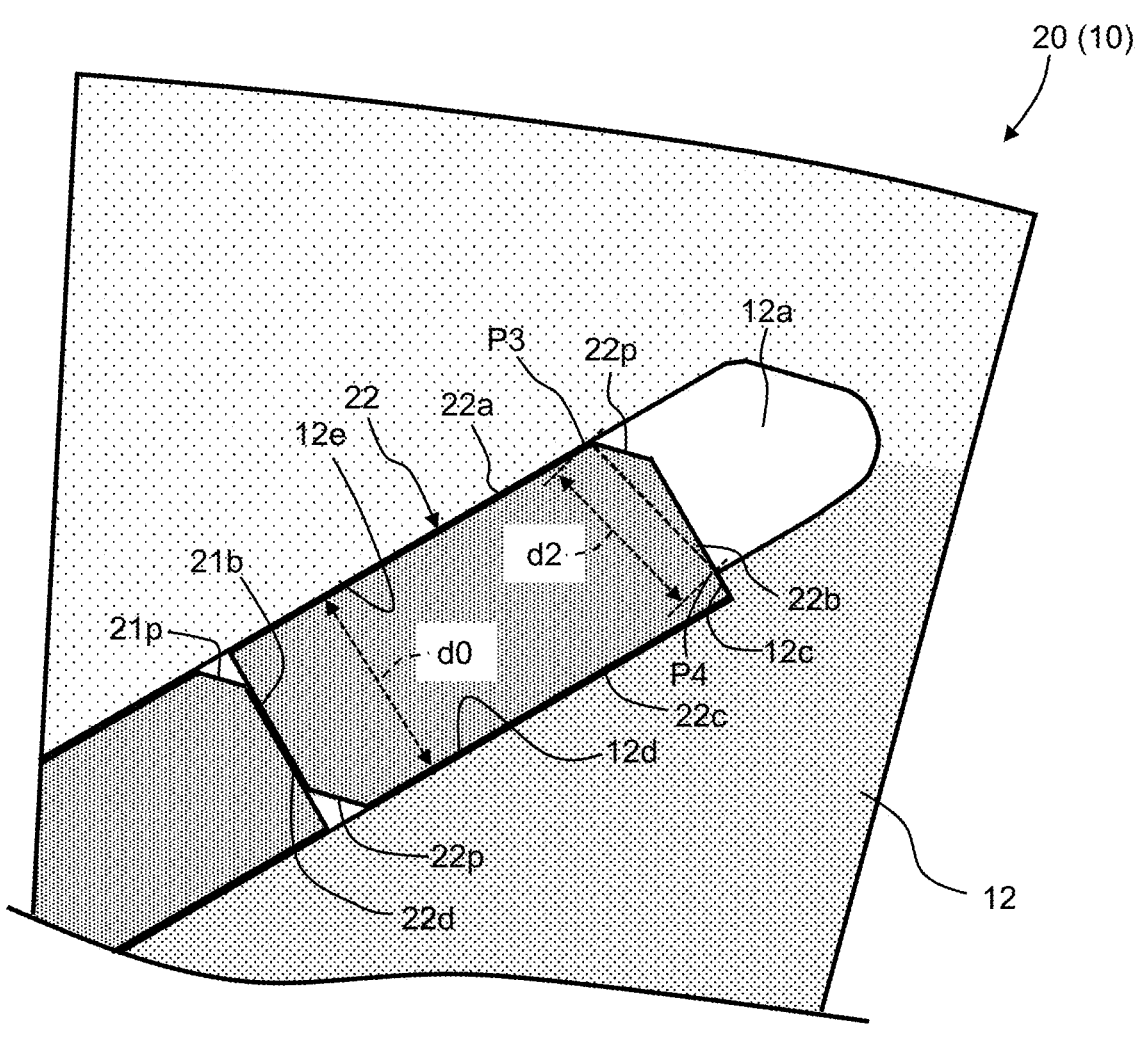
FIG. 5 is a partial cross sectional view illustrating a region around a second permanent magnet of the interior magnet rotor according to the embodiment.

FIG. 5 is a partial cross sectional view illustrating a region around the second permanent magnet 22 of the interior magnet rotor 10 according to the embodiment.

Around the second permanent magnet 22, the smallest width of the flux barrier is the distance d2 between point P3 and point P4 in the cross section in FIG. 5. Here, point P3 is the radially outermost portion of the first side face 22*a* of the second permanent magnet 22. Further, point P4 is the vertex portion of the outer positioning projection 12*c*. For a magnetic flux to pass between point P3 and point P4 with the shortest distance, it needs to pass the inside of the second permanent magnet 22.

Figure 6:
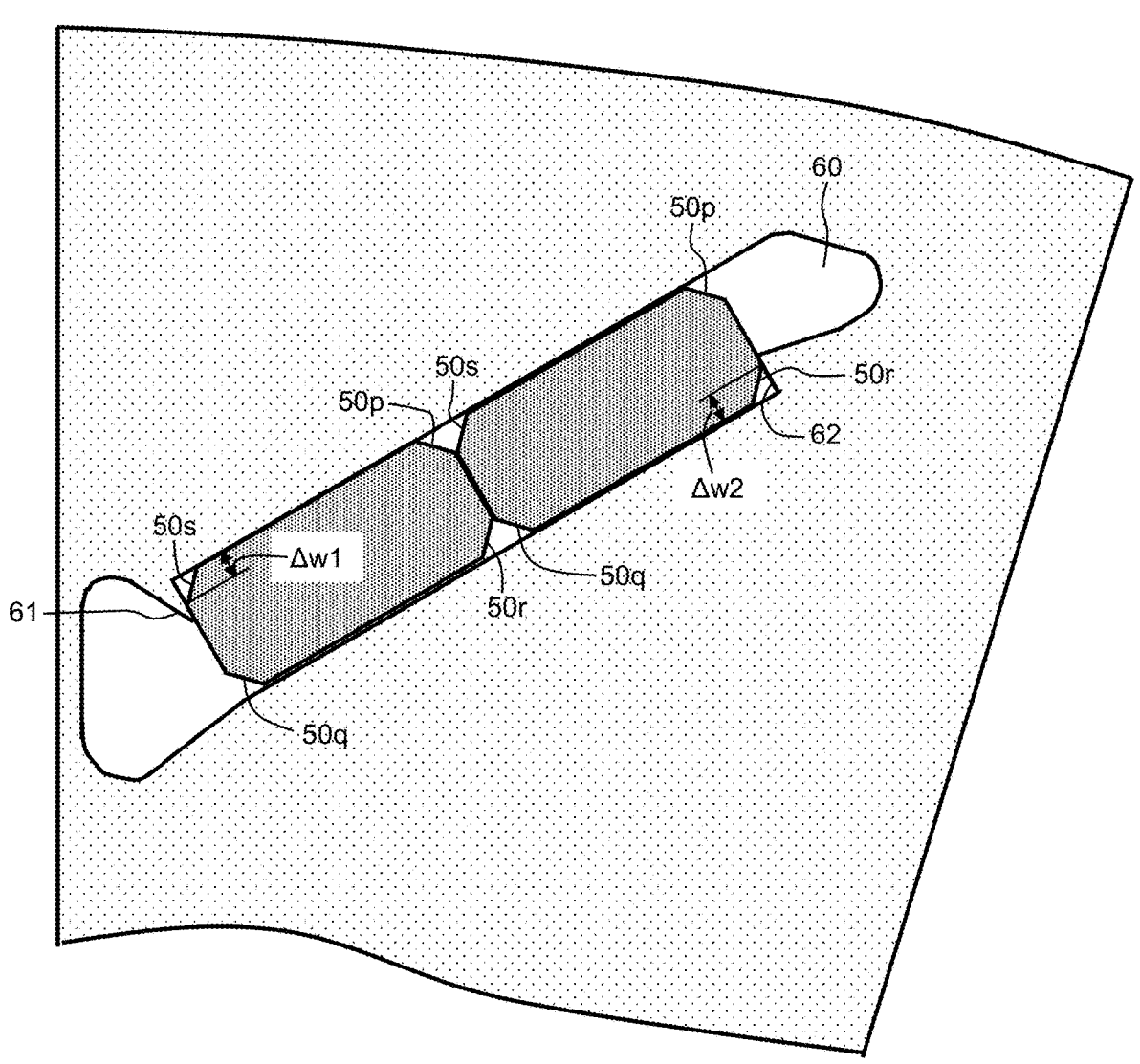
FIG. 6 is a partial cross sectional view illustrating a conventional example of a permanent magnet of an interior magnet rotor and illustrating the permanent magnet and a rotor core.

FIG. 6 is a partial cross sectional view illustrating a conventional example of a permanent magnet of an interior magnet rotor and illustrating the permanent magnet and a rotor core. FIG. 6 illustrates the conventional example as a comparative example with the present embodiment.

In the comparative example, two conventional permanent magnets 50 are arranged in line in the radial direction. The conventional permanent magnets 50 are different from those of this embodiment in that they each have slopes at four places, namely, they each have a first corner slope 50*p*, a second corner slope 50*r*, a third corner slope 50*q*, and a fourth corner slope 50*s*.

For comparison, the distance between two faces in the conventional permanent magnets 50 is equal to that in the first permanent magnet 21 and the second permanent magnet 22 of this embodiment. That is, the dimensions of their rectangular parallelepiped shapes are equal if the slopes are disregarded. Further, it is assumed that their slopes also have the same size. What is different is that the slopes which are portions corresponding to lacking from the rectangular parallelepiped shape are formed at the two corners opposite to each other in this embodiment while, in the comparative example, they are formed at four places which are all the corners.

Therefore, the shape of a magnet housing hole 60 housing the two conventional permanent magnets 50 is substantially the same as the shape of the magnet housing hole 12*a* in this embodiment. What is different is only that the dimension of an outer positioning projection 61 and an inner positioning projection 62 of the magnet housing hole 60 of the comparative example is different from the dimension of the inner positioning projection 12*b* and the outer positioning projection 12*c* of the magnet housing hole 12*a* of this embodiment.

Specifically, in the comparative example, to hold the conventional permanent magnet 50 on whose radially inner side the inner positioning projection 61 is arranged, the tip of the inner positioning projection 61 needs to extend into the magnet housing hole 60 so that it does not end in the middle of the fourth corner slope 50*s* formed in the conventional permanent magnet 50.

Here, a component along the extension direction of the inner positioning projection 61, of the width of the fourth corner slope 50*s* is referred to as "Δw1". If the same width as the width with which the inner positioning projection 12*b* of this embodiment holds the first permanent magnet 21 is tried to be obtained, the shortest distance reduces approximately to be (d1−Δw1) in the comparative example.

Similarly, in the comparative example, in order to hold the conventional permanent magnet 50 on whose radially outer side the outer positioning projection 62 is arranged, the tip of the outer positioning projection 62 needs to extend into the magnet housing hole 60 so that this tip does not end in the middle of the second corner slope 50*r* formed in the conventional permanent magnet 50.

Here, a component along the extension direction of the outer positioning projection 62, of the width of the second corner slope 50*r* is referred to as "Δw2". If the same width as the width with which the outer positioning projection 12*c* of this embodiment holds the second permanent magnet 22 is tried to be obtained, the shortest distance reduces approximately to be (d2−Δw2).

From the above, in this embodiment, as compared with the comparative example, it is possible to make the height of the inner positioning projection 12*b* and the outer positioning projection 12*c* shorter, and as a result, a magnetic reluctance at the time of the application of a demagnetizing field increases, making it possible to improve demagnetization resistance.

Figure 7:
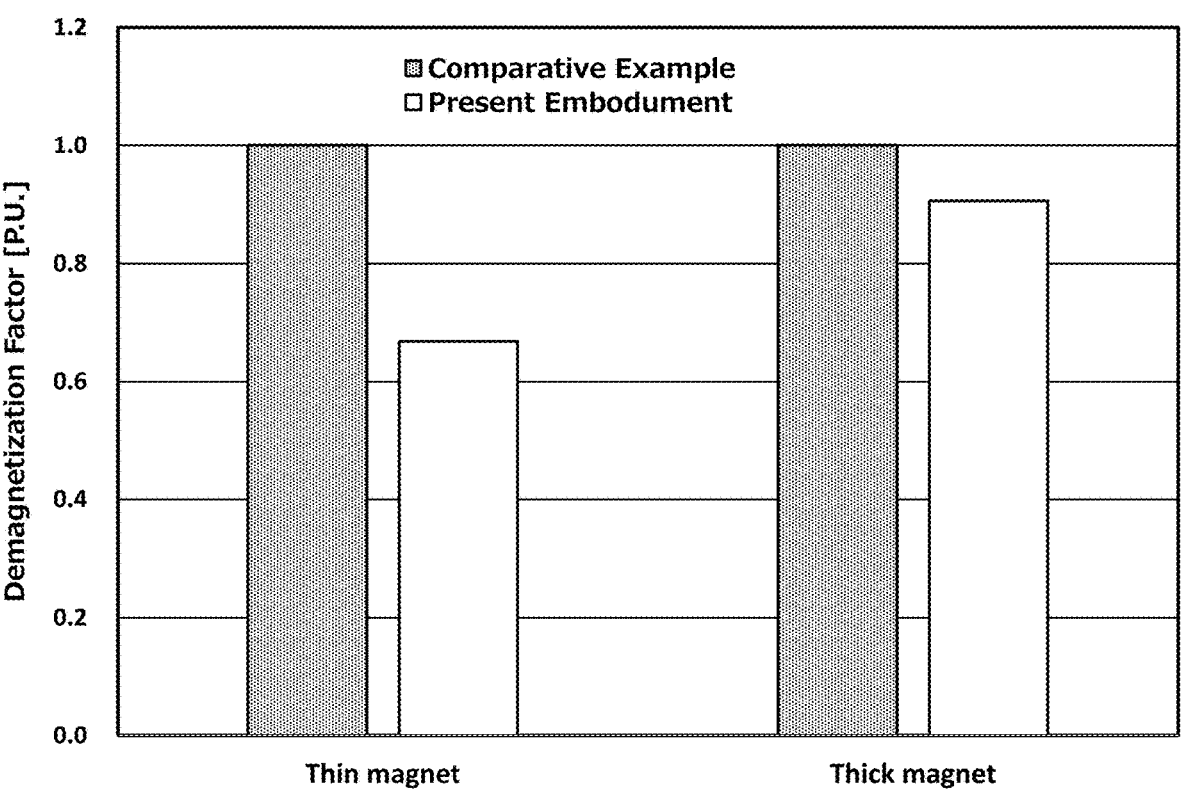
FIG. 7 is a graph illustrating an example of the comparison of a demagnetizing factor to explain the effect of the interior magnet rotor according to the embodiment.

FIG. 7 is a graph illustrating an example of the comparison of a demagnetizing factor to explain the effect of the interior magnet rotor 10 according to the embodiment. The horizontal axis represents cases, which are a case where the permanent magnet is thin and a case where it is thick. Further, regarding each of these cases, the case of the comparative example is illustrated with a gray bar, and the case of present embodiment is illustrated with a void bard. The vertical axis represents the demagnetizing factor [P.U.] and represents a relative value to a reference value in the comparative example.

As illustrated in FIG. 7, in the case where the permanent magnet is thin, the demagnetizing factor [P.U.] in the present embodiment is lower than that in the comparative example by 33%. Further, in the case where the permanent magnet is thick, the demagnetizing factor [P.U.] in the present embodiment is lower than that in the comparative example by 9%.

As described above, in the present embodiment, especially owing to the shorter height of the inner positioning projection 12*b* and the outer positioning projection 12*c*, the width of the portion where the width of the flux barrier is smallest increases, which makes it possible to increase a magnetic reluctance at the time of the application of a demagnetizing field and improve demagnetization resistance.

Figure 8:
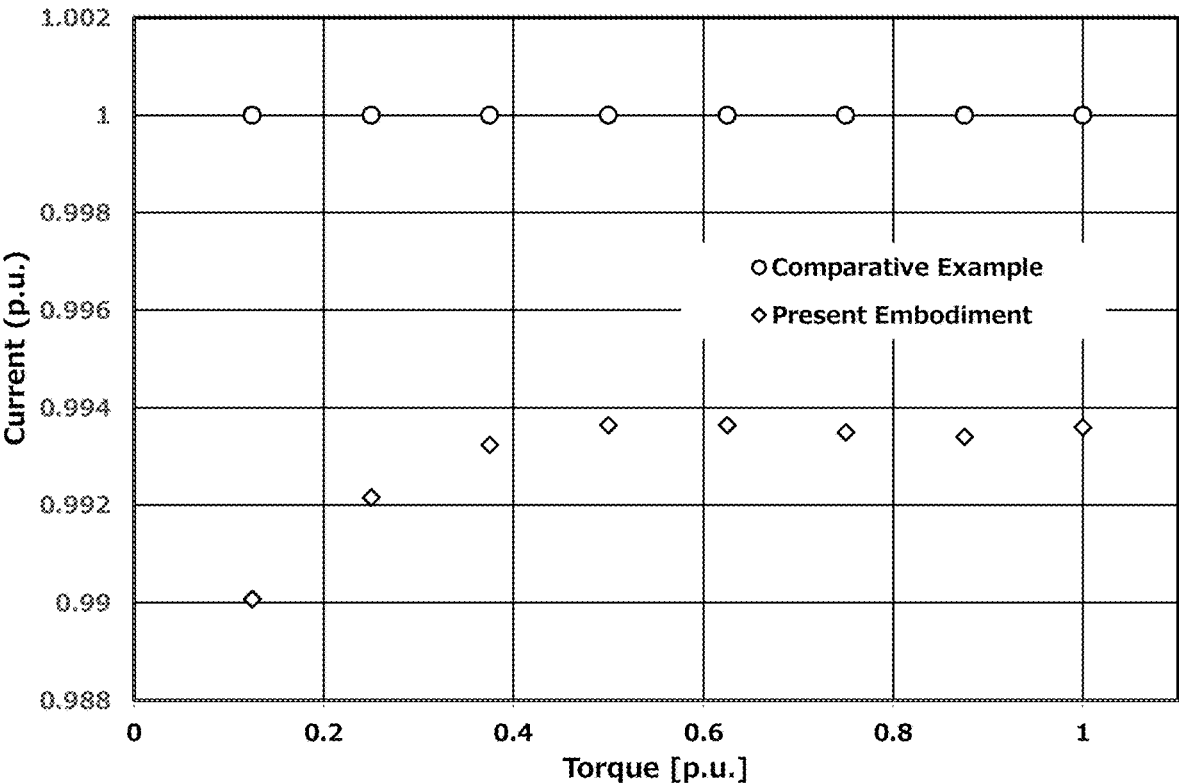
FIG. 8 is a graph illustrating an example of the comparison of torque-current characteristics to explain the effect of the interior magnet rotor according to the embodiment.

FIG. 8 is a graph illustrating an example of the comparison of the torque-current characteristics to explain the effect of the interior magnet rotor 10 according to the present embodiment. The horizontal axis represents a relative value of torque. The vertical axis represents an armature current flowing in the stator winding 32, which is necessary to generate the torque, and represents a relative value to a reference value in the comparative example. The void circles indicate the case of the comparative example and the black squares indicate the case of the present embodiment.

In the permanent magnet 20 in the present embodiment, the number of the portions corresponding to lacking from the rectangular parallelepiped shape due to the formation of the slopes is half of that in the comparative example. Accordingly, a reduction in magnetic force in the permanent magnet 20 from the rectangular parallelepiped shape is smaller than that in the comparative example. As a result, as illustrated in FIG. 8, it is possible to reduce the armature current by about 0.6% or more. That is, a larger torque can be obtained with the same value of the armature current.

As described above, while the conventional permanent magnet 50 in the comparative example has four slopes, the permanent magnet 20 in the present embodiment has the slopes respectively formed at the two places opposite to each other so that the number of the portions corresponding to lacking from the rectangular parallelepiped shape is half of that in the comparative example. Moreover, it is possible to increase the width of the portion, in the magnet housing hole 12a, where the width of the flux barrier is smallest. Note that the contact area between the first permanent magnet 21 and the second permanent magnet 22 adjacent to each other is the same as that in the comparative example.

As a result, it is possible to reduce the demagnetizing factor of the permanent magnet 20 and improve the torque-current characteristics.

Further, according to the present embodiment, the contact width of the permanent magnets 20 adjacent to each other, which is an index influencing the level of an eddy current, is the same as that in the comparative example. Further, regarding the permanent magnets 20 adjacent to each other, the corners with no slopes in one of the permanent magnets 20 are adjacent to the slopes in the adjacent permanent magnet 20, and thus the corners with no slopes are not adjacent to each other. As a result, the same effect as that of the comparative example is exhibited in terms of the prevention of the chipping of the corners.

Moreover, since the number of the slopes is reduced to half, the number of production processes can be reduced in the case, for example, wherein the slopes are formed by barrel polishing or grinder polishing.

According to the embodiment described hitherto, it is possible to provide an interior magnet rotor that achieves a reduction in a demagnetizing factor of its permanent magnet without causing an increase in an eddy current and without causing an increase in the risk of chipping of vertex portions in a plurality of permanent magnets housed in a row in a magnet housing hole.

Other Embodiments

While certain embodiments have been described, these embodiments have been presented by way of example only, and are not intended to limit the scope of the inventions. Further, the features of the embodiments may be combined. Further, the embodiments may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interior magnet rotor comprising:
a rotor shaft extending in a rotation axis direction;
a rotor core that has at least one magnet housing hole formed in each magnetic pole and sandwiched by a first wall and a second wall, and that is attached to the rotor shaft; and
a plurality of permanent magnets housed in the magnet housing hole and arranged in a row in one direction in a cross section of the magnet housing hole,
wherein the plurality of permanent magnets each have a substantially rectangular parallelepiped outer shape and have slopes formed over a longitudinal direction on two corners opposite to each other,
wherein the first wall and the second wall of the magnet housing hole respectively have a first holding projection and a second holding projection that project to the magnet housing hole to hold the plurality of permanent magnets, and
wherein in the permanent magnets, facing portions facing the first holding projection and the second holding projection respectively are corners where the slopes are not formed.

2. An interior magnet rotary electric machine comprising:
the interior magnet rotor according to claim 1; and
a stator having a stator core and stator windings wound around the stator core.

3. The interior magnet rotor according to claim 1, wherein the plurality of permanent magnets are arranged in a row with the slopes being in the same orientation.

* * * * *